United States Patent [19]
Dicke et al.

[11] Patent Number: 5,746,406
[45] Date of Patent: May 5, 1998

[54] TRIPOD STAND

[75] Inventors: Grant D. Dicke; Jeffrey A. Williams, both of Downers Grove, Ill.

[73] Assignee: Dicke Tool Company, Downers Grove, Ill.

[21] Appl. No.: 626,248

[22] Filed: Mar. 29, 1996

[51] Int. Cl.$^6$ .................................................. F16M 11/38
[52] U.S. Cl. ............................ 248/166; 40/610; 248/513
[58] Field of Search ..................................... 248/166, 165, 248/167, 170, 440, 83, 163.1, 164, 512, 513, 528, 529, 534; 40/606, 607, 610, 612

[56] References Cited

U.S. PATENT DOCUMENTS

| | | | |
|---|---|---|---|
| 911,770 | 2/1909 | Shively | 248/166 |
| 2,646,239 | 7/1953 | Young, Jr. | 248/166 |
| 3,080,139 | 3/1963 | Caprioli | 248/513 |
| 3,847,335 | 11/1974 | Ross | 248/166 |
| 4,203,242 | 5/1980 | Griffin | 248/168 |
| 4,865,287 | 9/1989 | Stoudt | 248/513 |
| 4,875,302 | 10/1989 | Noffsinger | 40/610 |
| 4,905,391 | 3/1990 | Dillon | 40/610 |
| 5,078,348 | 1/1992 | Babitchenko | 40/610 |
| 5,322,250 | 6/1994 | Wilhite, Jr. | 248/166 |
| 5,383,634 | 1/1995 | Liao | 248/166 |

*Primary Examiner*—Ramon O. Ramirez
*Assistant Examiner*—Anita M. King
*Attorney, Agent, or Firm*—Fitch, Even, Tabin & Flannery

[57] ABSTRACT

A tripod stand for roadway signs includes three legs pivotally connected to a mounting bracket at their upper ends. A plate is attached to the mounting bracket so that trough-shaped recesses are provided for guiding movement of two of the legs, with the bracket being formed to provide a trough-shaped recess regarding movement of a third leg.

11 Claims, 6 Drawing Sheets

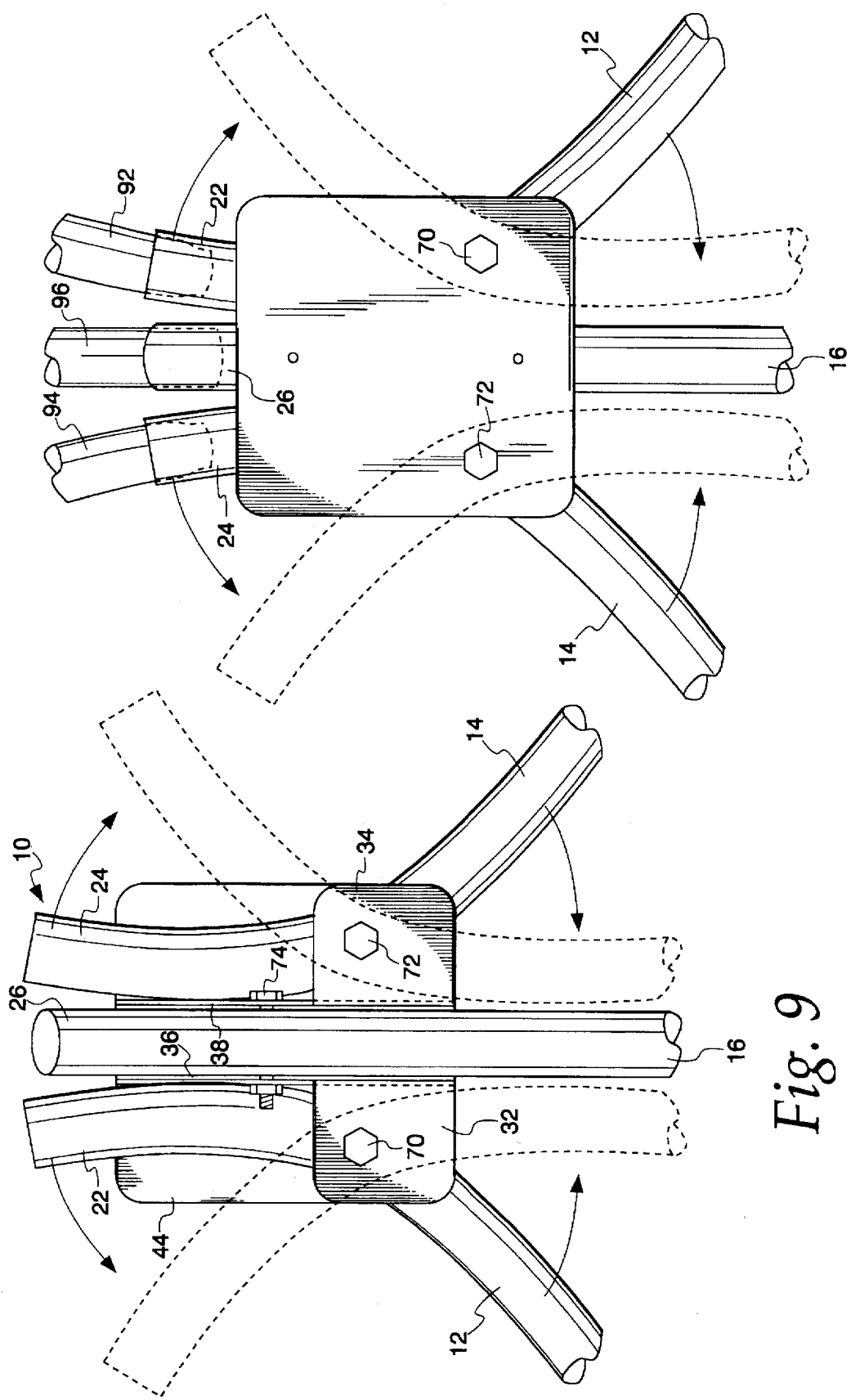

5,746,406

TRIPOD STAND

BACKGROUND OF THE INVENTION

1. Field of the Invention

The present invention pertains to stands, such as those used for signage, which are portable and which are collapsible for storage when not in use.

2. Description of the Related Art

Roadway signage may be required for events which are either unplanned, or which are scheduled ahead of time. In either event, signage requirements, especially for roadway warnings and the like, can be somewhat unpredictable. Even for regularly scheduled work, cite conditions may change from our to hour. If more signage is required than that originally estimated, then the ability to properly carry out a job may be threatened, and the job may have to be postponed. It is important in such instances that work crews be provided with a quantity of roadway signage devices which are immediately available on demand.

Many types of roadway signage devices have been proposed in the past, and the assignee of the present invention has made significant contributions to the field of roadway signage, especially signage of the temporary type which can either be readily be taken apart or collapsed to take on a small package size for easy storage within a work vehicle, for example. One sign stand offered for sale by the assignee of the present invention has met with widespread commercial success.

The sign stand, Catalog No. T100 is of a tripod design, with the three legs of the tripod base secured to a vertical upright member with separate brackets. In another type of tripod sign stand commercially available today, the legs of the tripod base are made of C-shaped channels. Two of the legs are secured to a flat plate member while a third plate is mounted to the flat plate member by brackets. Corrosion protection is an important feature for sign stands fabricated from metal components, especially when the sign stands are intended for outdoor use. Corrosion protection can contribute to the overall cost of a sign stand system, and improvements are accordingly continually sought after. Further, the need arises, from time to time, for an inexpensive lightweight sign stand, suitable for use both indoors and out.

SUMMARY OF THE INVENTION

It is an object according to principles of the present invention to provide a sign stand which can be economically fabricated from a minimal number of inexpensive parts.

Another object according to principles of the present invention is to provide a sign stand of the above-described type which inexpensively provides corrosion protection, so as to be suitable for use outdoors.

A further object according to principles of the present invention is to provide a sign stand of the above-described type which can be readily collapsed for storage in a confined place.

These and other objects according to principles of the present invention are provided in a sign stand adapted to support a sign panel above the ground, comprising: first, second and third legs, each having lower ground-engaging ends and upper ends adapted for coupling together as a tripod device; a unitary one-piece bracket made by forming a flat metal sheet so as to form a pair of opposed, spaced-apart wall means for receiving the third leg; pin means pinning the third leg to the wall means for rotation with respect to the wall means, between open and collapsed positions, with the wall means guiding movement of the third leg; a flat plate overlying the bracket and cooperating therewith so as to define recesses for receiving the first and second legs, each said recess having a pair of opposed wall portions receiving the upper end of a respective leg between the opposed wall portions and guiding movement of the respective leg; pin means pinning the first and the second legs to respective wall portions for rotation with respect to the wall portions, between open and collapsed positions, with the opposed wall portions guiding movement of the first and the second legs; and sign supporting means extending from at least one of the plate and the legs for supporting a sign panel.

BRIEF DESCRIPTION OF THE DRAWINGS

FIG. 9 is a fragmentary elevational view, taken on an enlarged scale, showing the upper portion of the stand of FIG. 1;

FIG. 10 is a rear elevational view thereof;

DETAILED DESCRIPTION OF THE PREFERRED EMBODIMENT

Figure 2:
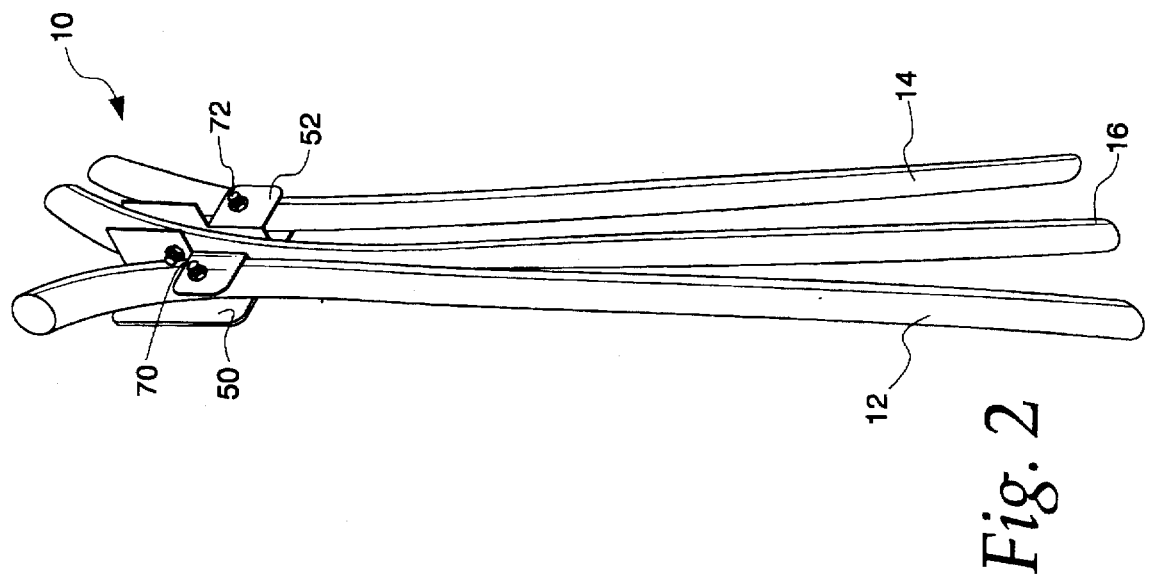
FIG. 2 is a perspective view similar to that of FIG. 1, but showing the stand in a collapsed position.
Figure 1:
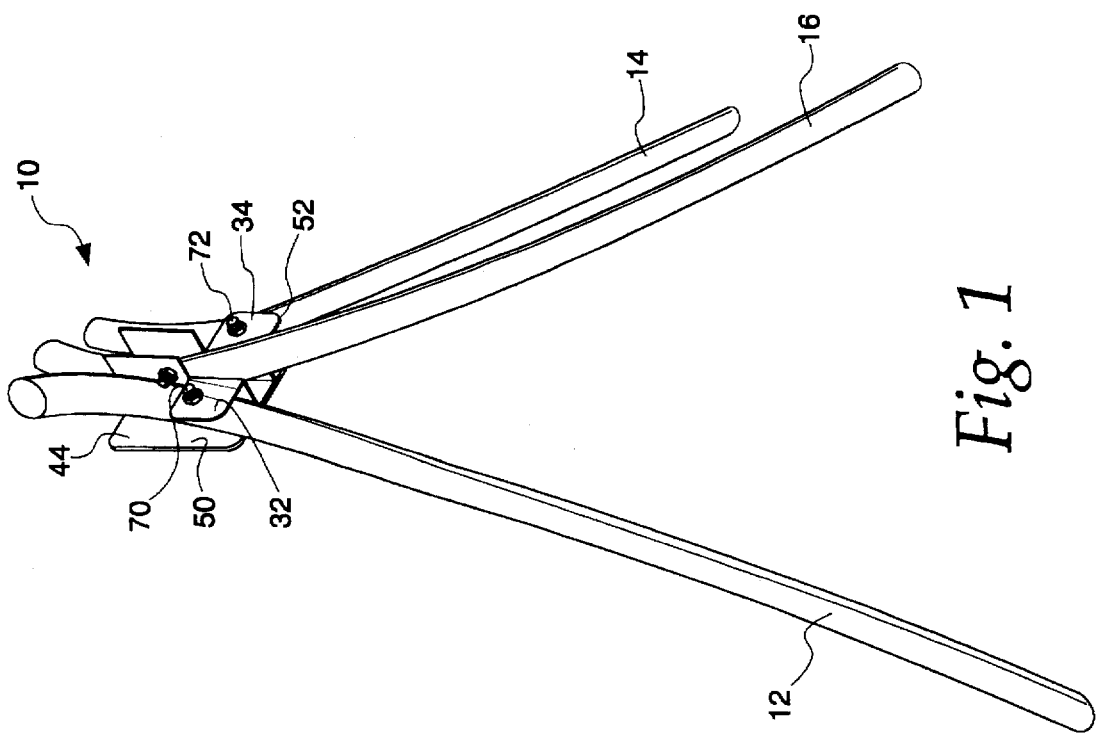
FIG. 1 is a perspective view of a stand in accordance with the principles of the present invention.

Referring now to the drawings, and initially to FIGS. 1 and 2, a sign stand generally indicated at 10 is shown in FIG. 1 in an open or operative position, and in FIG. 2 in a collapsed or storage position. Sign stand 10 includes first and second legs 12, 14 and a third leg 16. With additional reference to FIGS. 9–12, the legs 12–16 have upper curved ends 22-26, respectively. The legs 12–16 are preferably formed from hollow steel tubes, although other materials, either solid or hollow, could be used.

Figure 3:
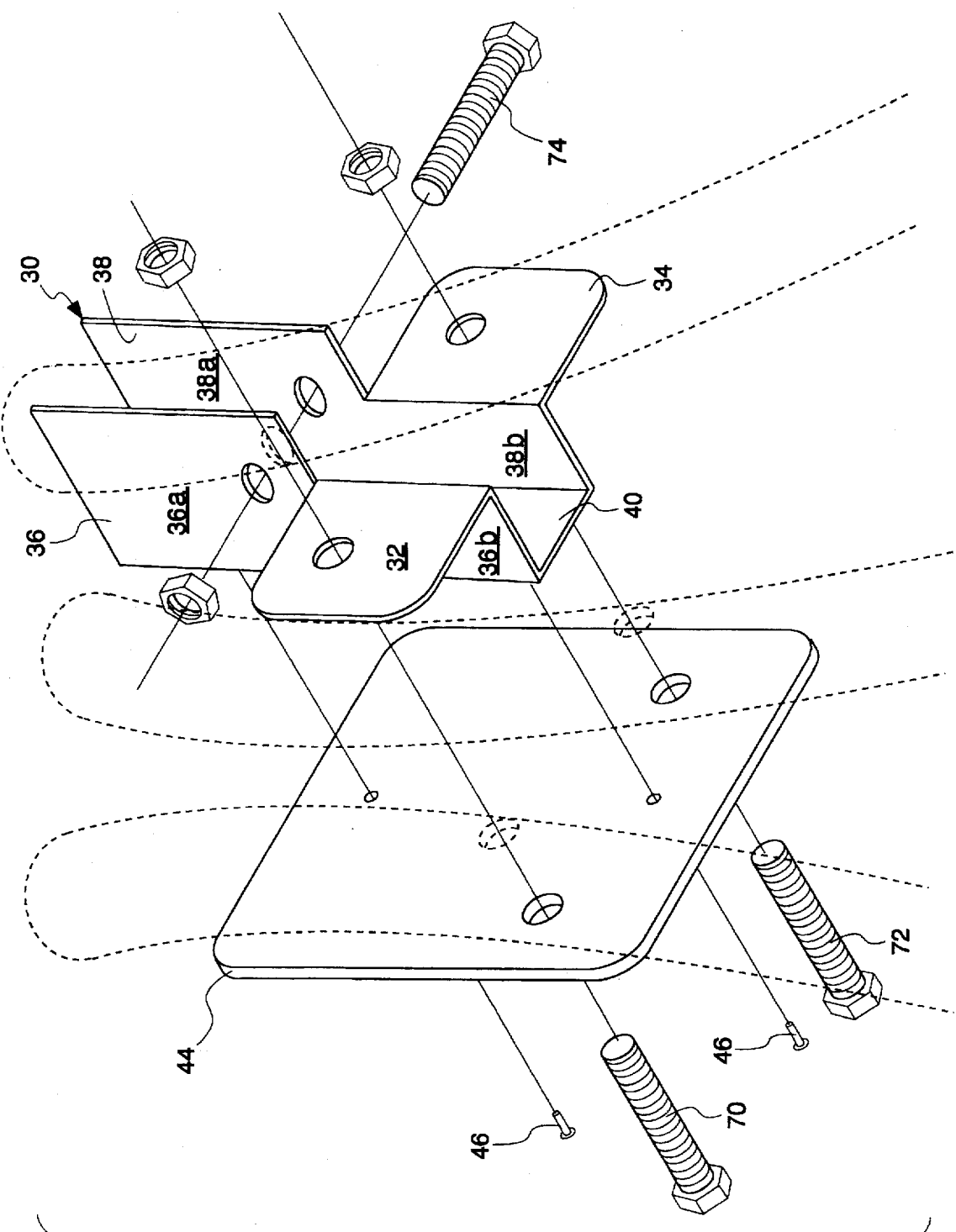
FIG. 3 is an exploded perspective view of the leg mounting portion thereof.
Figure 5:
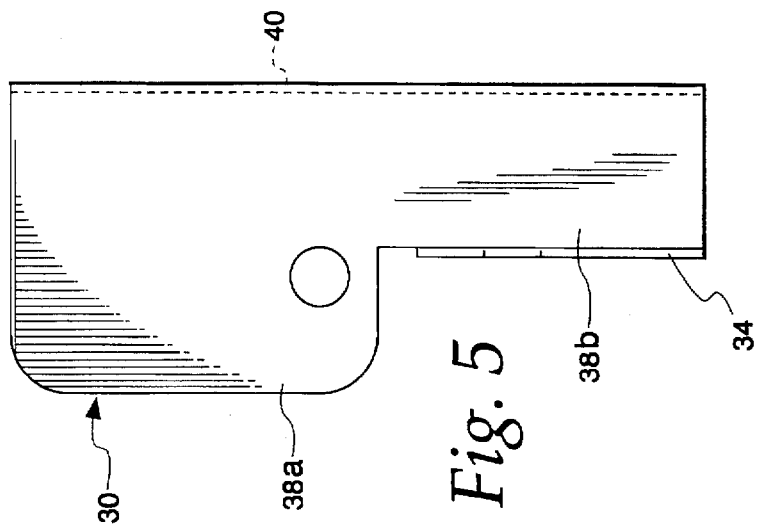
FIG. 5 is a side elevational view of the mounting bracket shown in FIG. 4.
Figure 4:
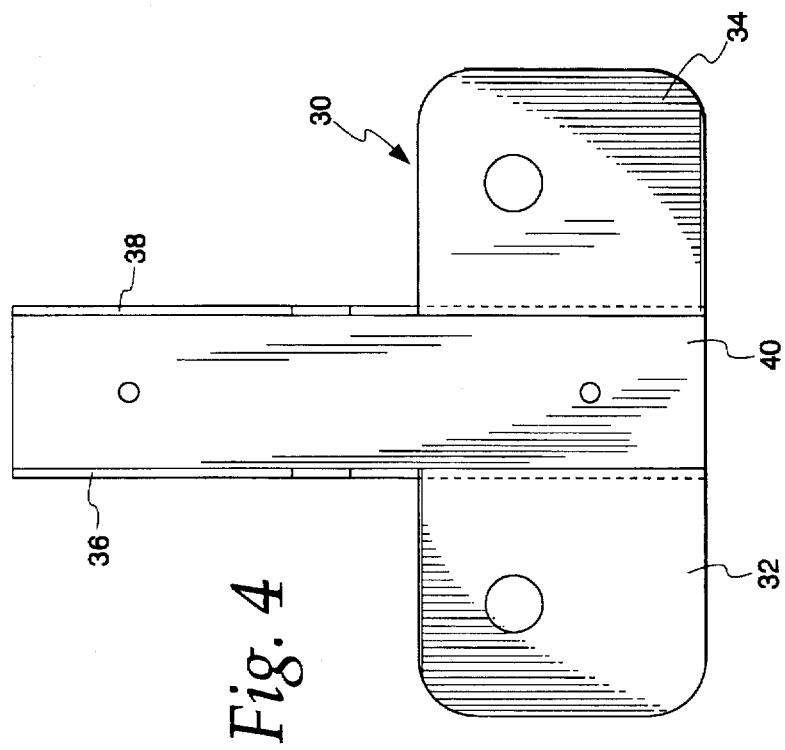
FIG. 4 is a plan view of the mounting bracket portion thereof.
Figure 6:
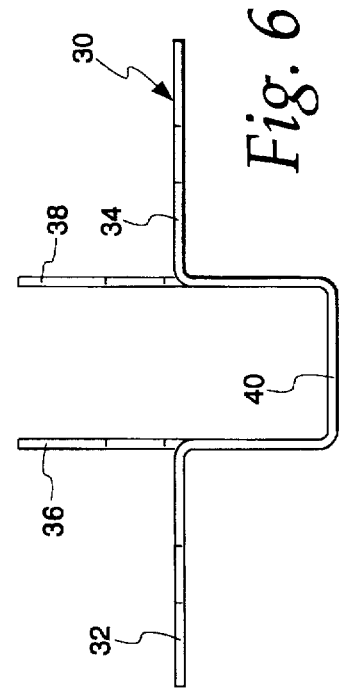
FIG. 6 is a bottom plan view of the mounting bracket of FIG. 4.
Figures 7, 8:
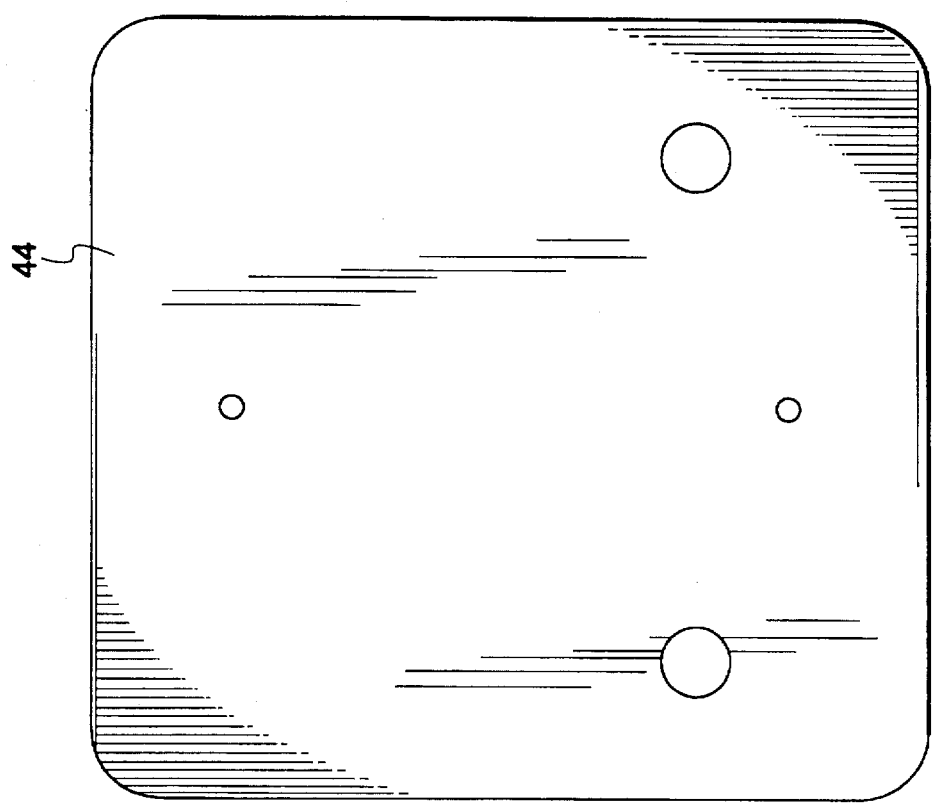
FIG. 7 is a front elevational view of the plate portion of the stand.
FIG. 8 is a side elevational view thereof.

Referring additionally to FIG. 3, the sign stand 10 includes a bracket generally indicated at 30 which is preferably formed from sheet metal, but could be substituted by other materials, such as molded plastic, for example. Bracket 30 includes a spaced-apart pair of wing walls 32, 34 arranged on either side of a central trough-like member having opposed sidewalls 36–38 and an intermediate or back wall 40. As can be seen in FIG. 3, the sidewalls 36, 38 for bracket 30 are stepped, having a larger wall part 36a and a shorter wall part 36b adjacent the wing wall 32. Similarly, sidewall 38 is stepped having a larger wall part 38a and a shorter wall part 38b adjacent wing wall 34.

A rectangular flat plate 44 is preferably made from sheet metal but could also be formed from plastic or other materials. Plate 44 is affixed to the back wall 40 of bracket 30 by rivets 46 or other suitable fasteners. The plate 44 cooperates with wing walls 32, 34 to form a pair of oppositely opening, late-receiving recesses 50, 52 (see for example FIGS. 1 and 2). The recesses 50, 52 are three-sided, and receive the upper ends of the first and second legs 12, 14. The recess 50 has a U-shaped configuration, with opposed walls formed by plate 44 and wing wall 32, and an intermediate wall formed by wall part 36b. In a similar fashion, the recess 52 is formed by opposed ends of plate 44 and wing wall 34, and an intermediate wall formed by bracket wall part 38b. As can be seen in FIGS. 1 and 2, for example, the first and second legs 12, 14 are fitted in their respective recesses, while the third leg 16 is fitted in a U-shaped recess formed between walls 36, 38. The legs 12–16 are pinned in their respective recesses by threaded fasteners 70–74. As a result, the first leg 12 is free to pivot within recess 50, between the open position illustrated in FIG. 1 and the closed or stored position illustrated in FIG. 2. In the closed position, the legs are brought close together to form a package having a generally cylindrical shape. Thus, the position of the legs in the closed position is readily indicated to a user. When opening the legs, so that the stand assumes the configuration shown in FIG. 1, It is important that the user be provided with an indication that the legs are in a defines, fully opened position. Referring now to FIG. 9, the stand 10 is shown in a fully opened position, corresponding to that illustrated in FIG. 1. As can be seen in FIG. 1, the curved upper end 22 of leg 12 contacts the bracket wall 36, thus preventing further opening (i.e., in the direction opposite that indicated by the arrows in FIG. 9). Similarly, the upper curved end 24 of leg 14 contacts bracket wall 38 in the fully open position. As leg 12 is moved between closed and open position, its movement is guided by plate 44 and wing wall 32, which it slides against while pivoting about threaded fastener 70. Similarly, the second leg 14 is guided by plate 44 and wing wall 34 as it pivots about threaded fastener 72, so as to be moved between closed and open positions. As indicated by FIGS. 11 and 12, it is preferred that legs 12, 14 remain in common coplanar alignment throughout their movement between closed and open positions, with the common plane extending generally parallel to plate 44 and wing walls 32, 34.

Figure 12:
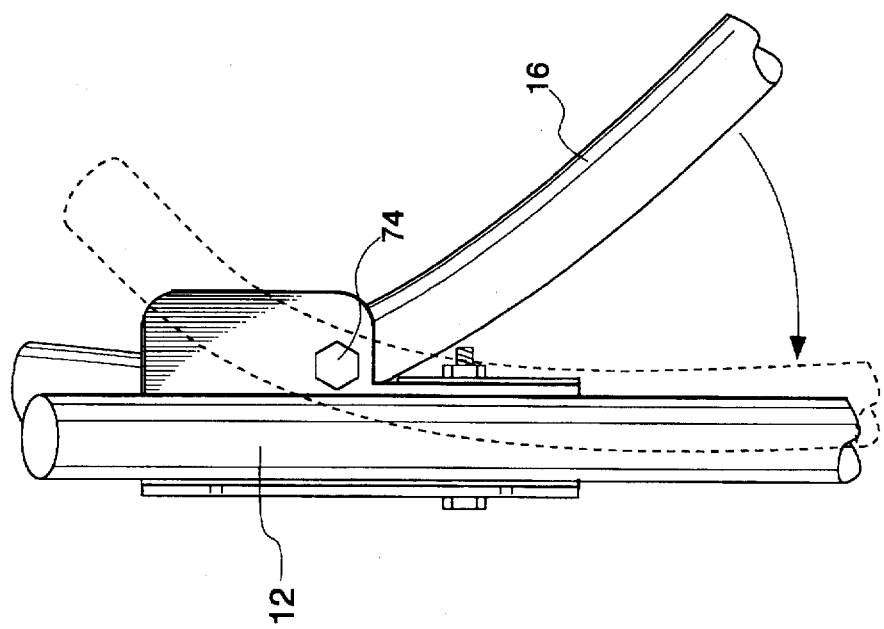
FIG. 12 is a side elevational view from the left side thereof.
Figure 11:
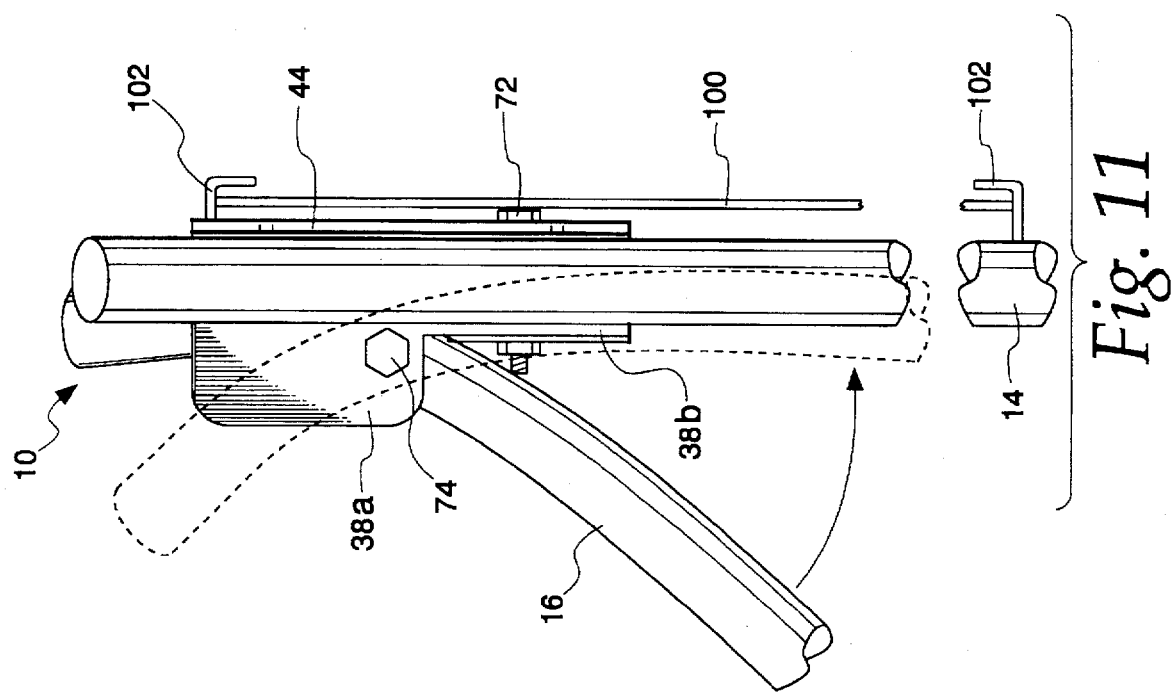
FIG. 11 is a side elevational view from the right side thereof.

FIGS. 11 and 12 show the third leg 16 in a fully open position, with the upper curved portion 26 abutting the back wall 40 of bracket 30 (which is not visible in FIGS. 11 and 12). As can be seen in FIG. 9, leg 16 is confined between walls 36, 38 of bracket 30. Leg 16 is also maintained in the common plane throughout its range of movement. With reference to FIG. 9, the bracket walls 36, 38 slidingly engage leg 16 throughout at least part of its motion, and preferably throughout its full range of motion between closed and open positions (indicated by phantom and solid lines in FIGS. 11 and as).

Thus, with the arrangement of the present invention, the legs of the sign stand are prevented from wobbling. With a close tolerance fit between the restraining walls and the legs of the tripod stand, the preferred embodiment of the present invention effectively eliminates a sideways wobble of the legs in any position they might assume during normal operation of the sign stand. This helps to reduce premature distortion of the sign stand components when inadvertent forces are applied to the legs in directions which would not be associated with a pivoting about their respective threaded fasteners.

Although it is generally preferred that plate 44 be provided to form a three-sided channel or recess for each leg, it may be possible in some instances to eliminate plate 44, replacing the plate with suitable fastening means for the pivot pins. For example, the threaded fasteners 70, 72 could be replaced by rivet fasteners having suitably large heads which presses the legs 12, 14 against their associated wing walls 32, 34. If the threaded fasteners are used, washers can be employed to bear against the legs 12, 14, to press the legs against their respective wing walls.

Referring to FIG. 10, the legs 12–16 receive flag staffs 92–96, respectively. As mentioned, the legs 12–16 are preferably formed from metal tubes, and thus the upper ends of the legs provide a socket function for telescopically receiving members such as warning flags to be associated with the sign stand. The warning flags could comprise, for example, panels of brightly colored material, such as orange plastic film, affixed to flag staffs 92–96 illustrated in FIG. 10. If desired, the legs 12–16 could have a composite structure, with only the upper ends being hollow tubular in configuration, the upper ends being affixed to the major portion of the legs so as to extend therefrom using conventional means. For example, the upper ends 22–26 could comprise hollow tubes formed with the desired bends, as illustrated in the Figures. A major portion of the legs could be of solid construction, for example, with a stepped, plug-like end to be received in the lower ends of the hollow tubes, and affixed thereto with suitable adhesives, welding, staking or other conventional techniques.

Referring to FIG. 11, a sign panel 100 is installed on stand 10, being received between L-shaped hooks 102 mounted in plate 44 and in legs 14, 16. Other types of conventional mounting devices can be used in place of the L-shaped hooks 102, if desired.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following claims.

What is claimed is:

1. A sign stand adapted to support a sign panel above the ground, comprising:

a first leg, a second leg and a third leg, each having lower ground-engaging ends and upper ends adapted for coupling together as a tripod device;

a unitary one-piece bracket made by forming a flat metal sheet so as to form a pair of opposed, spaced-apart wall means for receiving the third leg;

first pin means for joining the third leg to the wall means, the first pin means pinning the third leg to the wall means for rotation with respect to the wall means, between open and collapsed positions, with the wall means guiding movement of the third leg;

a flat plate overlying the bracket and cooperating therewith so as to define recesses for receiving the first and second legs, each said recess having a pair of opposed wall portions receiving the upper end of a respective leg between the opposed wall portions and guiding movement of the respective leg;

second pin means for joining the first and the second legs to the wall means, the second pin means pinning the first and the second legs to respective wall portions for rotation with respect to the wall portions, between open and collapsed positions, with the opposed wall portions guiding movement of the first and the second legs;

sign supporting means for supporting the sign panel, said sign supporting means extending from at least one of said plate and said legs the upper ends of the first and the second legs having curved portions which are curved away from each other, with the curved portions including stop surfaces interfering with the bracket to limit rotation of the first and the second legs; and said flat plate providing a stop surface for the third leg, engaging the curved end of the third leg when the third leg is rotated to the open position.

2. The sign stand of claim 1 wherein the upper end of the third leg has a curved portion which is curved away from the plate, with the curved portion including a stop surface interfering with the plate to limit rotation of the third legs.

3. The sign stand of claim 2 wherein the legs are formed from tubes having rounded cross sections, with the upper ends of the legs being open and pointing so as to provide socket mounting of flag staffs inserted within the upper ends.

4. The sign stand of claim 1 further comprising warning flags coupled to the upper ends of the legs.

5. The sign stand of claim 4 wherein the legs comprise hollow tubes and the flags are inserted in the upper ends of the legs.

6. A sign stand adapted to support a sign panel above the ground, comprising:

a first leg, a second leg and a third leg, each having lower ground-engaging ends and upper ends adapted for coupling together as a tripod device, the upper ends of the legs having curved portions which are curved away from each other;

a plate;

a unitary one-piece bracket formed of sheet material defining a recess for the third leg, and cooperating with the plate so as to define recesses for the first and second legs, each said recess having a pair of spaced-apart opposed wall portions receiving and guiding the upper end of a respective leg between the opposed wall portions and each said recess having a stop wall between the pair of spaced-apart opposed wall portions, the stop wall of the bracket attached to the plate and providing a stop surface engaging the curved end of the third leg when the third leg is rotated to the open position, the bracket providing stop surfaces for the first and second legs, engaging the curved ends of the first and second legs, when the first and second legs are rotated to the open position;

the curved portions including stop surfaces interfering with the plate and bracket to limit rotation of the legs;

pin means for joining the legs to respective wall portions, the pin means pinning the legs to respective wall portions for rotation with respect to the wall portions, between open and collapsed positions; and the legs formed from tubes having rounded cross sections, with the upper ends of the legs being open and pointing so as to provide socket mounting of warning devices inserted within the upper ends.

7. The sign stand of claim 6 wherein the warning devices comprise warning flags with flag staffs inserted in the upper ends of the legs.

8. A sign stand adapted to support a sign panel above the ground, comprising:

a first leg, a second leg and a third leg, each having lower ground-engaging ends and upper ends adapted for coupling together as a tripod device;

a unitary one-piece bracket formed of sheet material defining a pair of spaced-apart, wall portions and a trough member extending from the wall portions and cooperating therewith to form pockets receiving and guiding movement of the first and the second legs, with the trough member receiving the third leg, separating the third leg from the first and the second legs and guiding movement of the third leg;

pin means for providing support for the legs, the pin means pinning the first and the second legs to respective wall portions for rotation with respect to the wall portions between a collapsed position with the upper ends of the legs away from the trough member and an open position with the upper ends of the legs bearing against the trough member and said pin means further pinning the third leg to the bracket; and the legs formed from tubes having rounded cross sections, with the upper ends of the legs being open and pointing so as to provide socket mounting of warning devices inserted within the upper ends.

9. The sign stand of claim 8 wherein the warning devices comprise warning flags with flag staffs inserted in the upper ends of the legs.

10. A sign stand adapted to support a sign panel above the ground, comprising:

a first leg, a second leg and a third leg, each having lower ground-engaging ends and upper ends adapted for coupling together as a tripod device;

a plate;

a unitary one-piece bracket formed of sheet material defining a pair of spaced-apart wall portions opposite the plate and a trough member joined to the plate, extending from the wall portions and cooperating with the wall portions and with the plate to form three-sided recess means receiving and guiding movement of the first and the second legs, with the trough member receiving the third leg, separating the third leg from the first and the second legs and guiding movement of the third leg;

pin means for providing support for the legs, the pin means pinning the first and the second legs to respective wall portions for rotation with respect to the wall portions, between a collapsed position with the upper ends of the legs away from the trough member and an open position with the upper ends of the legs bearing against the trough member and said pin means further pinning the third leg to the bracket; and the legs formed from tubes having rounded cross sections, with the upper ends of the legs being open and pointing so as to provide socket mounting of warning devices inserted within the upper ends.

11. The sign stand of claim 10 wherein the warning devices comprise warning flags with flag staffs inserted in the upper ends of the legs.

* * * * *